Figure 1:
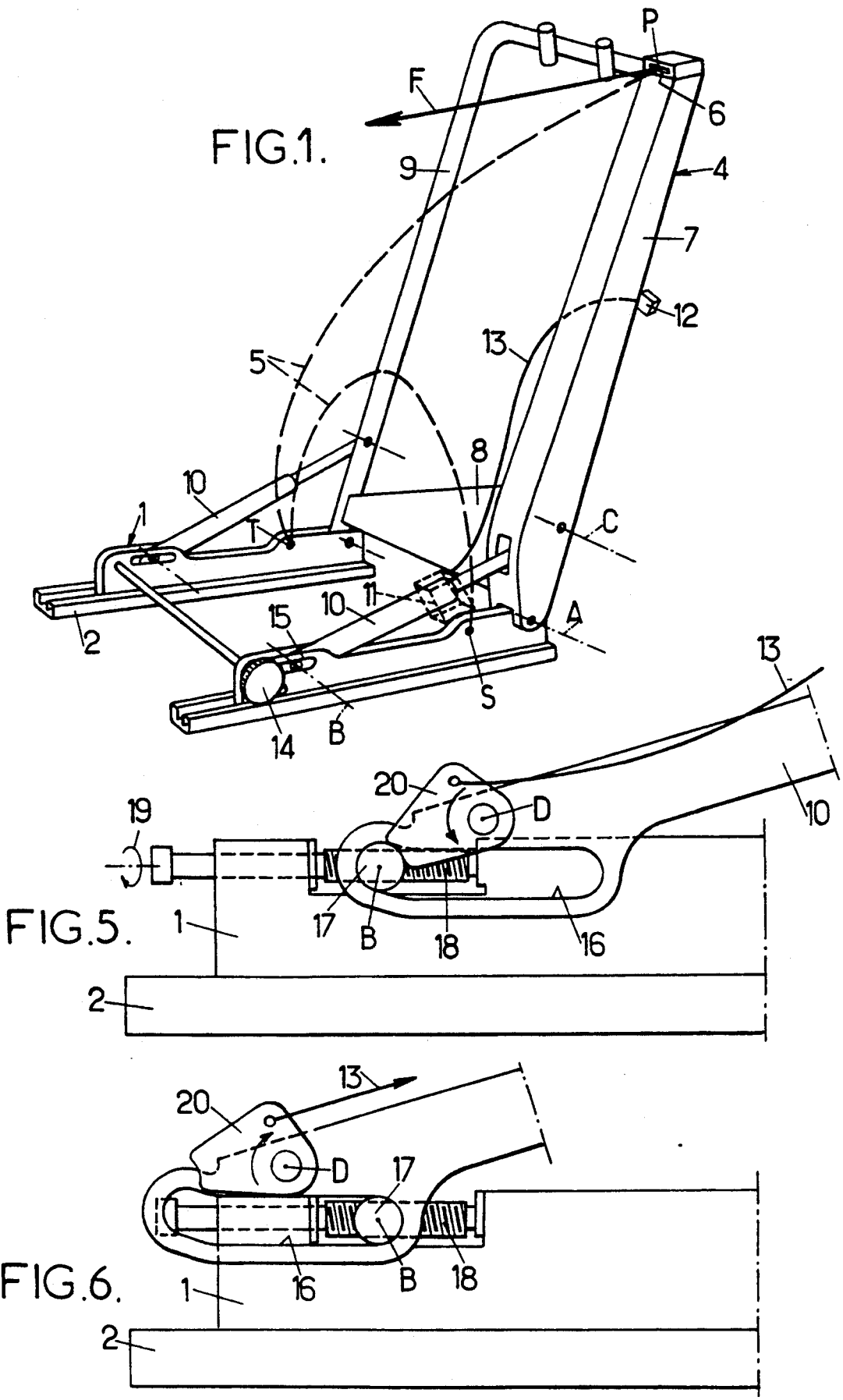

United States Patent [19]

Boisset

[11] Patent Number: 5,246,271
[45] Date of Patent: Sep. 21, 1993

[54] VEHICLE SEATS WITH BUILT-IN SAFETY BELT

[75] Inventor: Bernard Boisset, Etampes, France

[73] Assignee: Bertrand Faure Automobile, France

[21] Appl. No.: 683,977

[22] Filed: Apr. 3, 1991

[30] Foreign Application Priority Data

Apr. 4, 1990 [FR] France ................ 90 04326

[51] Int. Cl.⁵ .............................................. B60N 2/20
[52] U.S. Cl. ............................. 297/362.13; 297/483;
297/452.20; 297/378.12
[58] Field of Search .............. 297/216, 355, 361, 379,
297/468, 483

[56] References Cited

U.S. PATENT DOCUMENTS

| | | | |
|---|---|---|---|
| 2,018,825 | 10/1935 | Wood | 297/355 X |
| 2,596,760 | 5/1952 | Bryant | 297/361 |
| 3,761,127 | 9/1973 | Giese et al. | 297/216 X |
| 4,192,545 | 3/1980 | Higuchi et al. | 297/216 |
| 4,804,226 | 2/1989 | Schmale | 297/216 |
| 4,887,864 | 12/1989 | Ashton | 297/452 X |
| 5,000,283 | 3/1991 | Krieg | 297/379 X |

FOREIGN PATENT DOCUMENTS

| | | | |
|---|---|---|---|
| 1957496 | 5/1971 | Fed. Rep. of Germany | 297/216 |
| 2324168 | 11/1974 | Fed. Rep. of Germany | . |
| 7923386 | 8/1979 | Fed. Rep. of Germany | . |
| 3412139 | 10/1984 | Fed. Rep. of Germany | 297/361 |
| 483390 | 7/1953 | Italy | 297/361 |
| 802176 | 10/1958 | United Kingdom | 297/361 |

Primary Examiner—Peter R. Brown
Attorney, Agent, or Firm—Larson and Taylor

[57] ABSTRACT

A vehicle seat is disclosed with built-in safety belt (5). The framework of the seat-back comprises a vertical, laterally located beam (7) which is very resistant to flexional forces and carries the upper anchorage point P of the belt and a lower cross-piece (8) fixed to the base of the beam and sufficiently resistant to prevent transverse inclination of this beam. A strut (10) has its ends mounted for pivoting, respectively, about a transverse axis B linked to the front of the base (1) and about a transverse axis C forming part of the beam. Axis C is disposed at a distance, from the transverse pivoting axis A of the seat-back (4), which is less than 1/6 of the distance separating this axis A from the upper anchorage point P of the belt. The position of axis C about axis A is adjustable.

9 Claims, 2 Drawing Sheets

VEHICLE SEATS WITH BUILT-IN SAFETY BELT

The invention relates to vehicle seats with built-in safety belt, i.e. equipped with a safety belt and themselves having the anchorage points for this belt, generally three in number, one of these points being disposed at the top of the seat-back.

It relates more particularly, among such seats, to those whose seat-back is adjustable in inclination and preferably which can be further tipped forward about a lower transverse horizontal axis, as is required for the front seats of certain coupes or convertibles so as to make the rear seats of these vehicles accessible.

The location of the safety belt anchorage at a high point P of the seat-back rather than on the bodywork of the vehicle is made necessary when this bodywork does not have an appropriate high point (the case of coupes and convertibles).

Furthermore, in all cases, such location has the important advantage of the independence between adjustment of the belt and the advanced or retracted position of the seat and the inclination of its seat-back.

But it raises the problem of the mechanical resistance of this seat-back to the forces exerted on said point P.

In particular, during sudden deceleration of the vehicle, the force F exerted horizontally forwards on point P may be very high and the adjustable and possibly tipping hinge mechanisms proposed at the present time for the seats considered are not strong enough to withstand such forces.

The object of the invention is especially to overcome this drawback by proposing for the seats of the kind considered and their hinge mechanisms a sufficiently robust construction for withstanding the above forces.

For this, the vehicle seats of the kind in question according to the invention still comprise a seat-back mounted for pivoting about a lower transverse horizontal axis A linked to the base of the seat and they are essentially characterized in that the framework of this seat-back comprises a vertical, laterally located very flexion resistant beam carrying the upper anchorage point P of the belt, a lower cross-piece fixed to the base of the beam and sufficiently resistant to prevent the transverse inclination of this beam and an L shaped piece fixed on the beam and on the cross-piece so as to form a frame therewith, and in that a buckling resistant strut is provided whose ends are mounted for pivoting, respectively, about a transverse horizontal axis B linked to the front of the base of the seat and about a transverse horizontal axis C forming part of the beam and disposed at a distance, from axis A, which is less than 1/6 of the distance separating this axis A from the upper anchorage point P of the belt, and means acting on the strut for adjusting the position of axis C about axis A.

In advantageous embodiments, recourse is further had to one and/or other of the following arrangements:
the beam is of a hollow prismatic box type,
the cross-piece comprises essentially a metal sheet of trapezoidal shape whose large base is welded against the beam,
the means for adjusting the position of axis C are arranged so as to modify the longitudinal position of the axis B with respect to the base,
the adjustment means according to the preceding paragraph operate by screwing a threaded rod connected angularly to a control member and mounted on the base of the seat, in a nut fast with the lower end of the strut, in a seat according to the preceding paragraph, means controllable from a handle mounted on the seat-back are provided for momentarily suppressing the interconnection between the threaded rod and the strut for tipping the seat-back, the means for adjusting the position of axis C are arranged so as to modify the distance between the two axes B and C, in a seat according to the preceding paragraph, the strut has a telescopic construction, the two elements mounted slidingly one in the other forming this strut are normally interlocked mutually and means controllable from a handle mounted on the seat-back are provided for momentarily suppressing such interlocking.

Apart from these main arrangements, the invention comprises certain other arrangements which are used preferably at the same time and which will be more explicitly discussed hereafter.

In what follows, some preferred embodiments of the invention will be described with reference to the accompanying drawings in a way which is of course in no way limitative.

Figure 2:
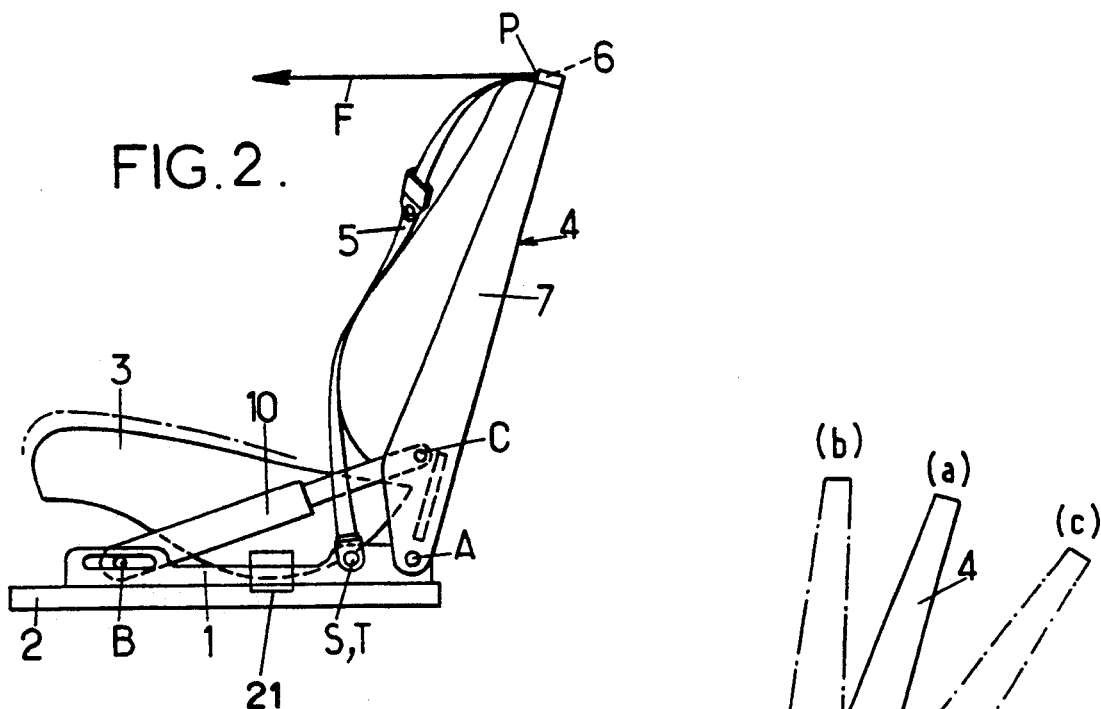

FIGS. 1 and 2 of these drawings show respectively in a three-quarter front perspective view and a side view, a vehicle seat framework with built-in safety belt constructed in accordance with the invention, the sitting portion and the cushion of the seat only being shown in FIG. 2.

Figure 3:
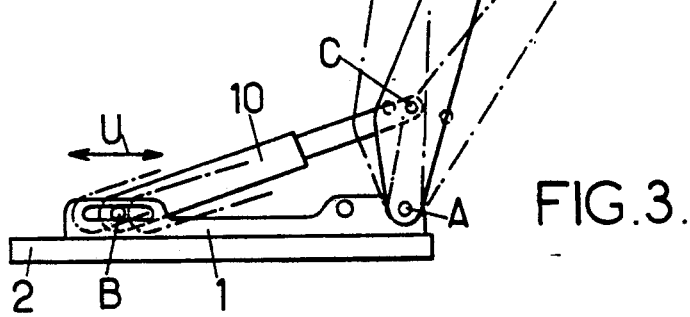
Figure 4:
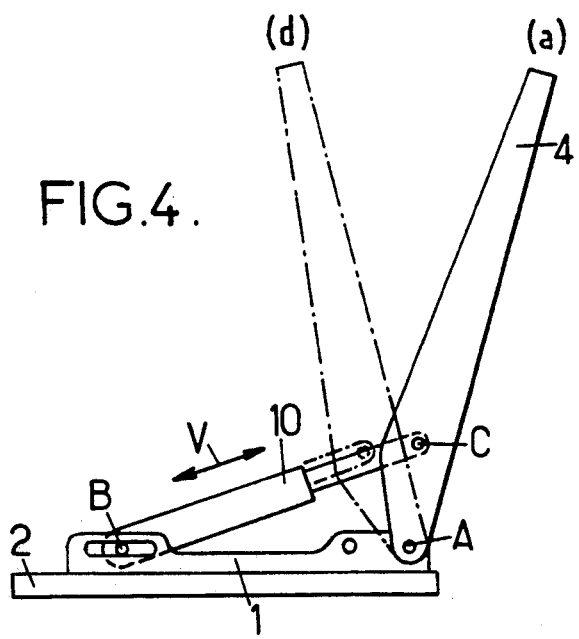

FIGS. 3 and 4 are diagrams showing the different positions occupied by the seat-back and the strut which is associated therewith respectively for three inclination adjustment positions and for two end tipping positions.

FIGS. 5 and 6 finally show in greater detail a possible embodiment for a mechanism for adjusting the inclination of the seat-back and releasing same for tipping.

Generally, the vehicle seat considered comprises, in each case:
a base 1 mounted for sliding on two longitudinal horizontal slides 2 fixed on the chassis or floor of the vehicle, means (not shown) being provided for adjusting as required the position of the base along these slides and for locking it in each of its adjusted positions,
a sitting portion 3 mounted on the base,
a seat-back 4 mounted for pivoting about a lower transverse horizontal axis A linked to the base,
and a safety belt 5.

This safety belt 5 is "built-in", i.e. mounted completely on the seat, with its three anchorage points disposed on this seat, namely two low points S and T disposed on the two sides of the base and an upper point P disposed at the top of the seat-back.

In actual fact, point P while referred to for convenience as an anchoring point, does not correspond directly in practice to the point where the belt is actually fixed to the frame, but to the entrance of the belt into a passage 6 leading to the winding mechanism reel.

The location of the low anchorage points S and T on base 1 implies a good resistance of this base to vertical tearing forces, with respect to slides 2.

This problem is solved by appropriate means which do not form part of the present invention. The invention concerns essentially the consequences to be drawn from locating the upper anchorage point P at the top of the seat-back 4.

In fact, because of such location, during sudden deceleration, this point P is subjected by the weight of the user fastened by the belt to the seat, to a very high forwardly oriented force F.

This force F may reach and even exceed a ton.

The constructions usually proposed for the seat-backs and their hinge mechanisms are not strong enough to withstand such forces.

The very robust construction proposed here is compatible with such forces.

This construction concerns, on the one hand, the very construction of the frame of the seat-back and, on the other hand, the mechanism for adjusting the inclination thereof.

In so far as the framework of seat-back 4 is concerned, having a general shape of a frame, it comprises:

a vertical, laterally located beam 7 having high flexion resistant strength, a lower cross-piece 8 (FIG. 1) having a high buckling strength and fixed to the base of beam 7, and a rigid L shaped piece 9 fixed to the beam and to the cross-piece so as to complete said frame therewith, the base of this piece 9 being mounted for pivoting, like beam 7, about axis A.

The beam 7 is advantageously formed in the manner of a hollow prismatic box with rectangular cross section and whose thickness increases slightly downwards.

Cross-piece 8 is advantageously formed by at least one metal sheet having a general trapezoidal shape whose large base is welded against the base of beam 7.

The frame thus formed by the set of elements 7, 8 and 9 has great rigidity and in particular high resistance to flexional forces and to transverse crushing likely to be generated by application on point P of the above defined forces F, which are not contained in longitudinal planes but are slightly inclined with respect to such planes.

There is further provided:

for maintaining the seat-back 4 in each of its pre-adjusted inclined positions, two parallel struts 10 having high buckling strength and mounted for pivoting about a transverse horizontal axis B linked to the front of base 1 and about a transverse horizontal axis C fast with seat-back 4, and, to make the angular adjustments and tippings of the seat-back 4 possible about its lower axis A, means for adjusting as desired the distance between axes B and C or the relative position of axis B with respect to the base.

The axis C must be placed fairly low so that, considering the thickness of the cushion of the sitting portion 3 (see FIG. 2), the presence of the struts 10 in no way hinders the lateral accessibility to said cushion by the user of the seat.

For this reason, the distance between the axes A and C should only be a small fraction of the distance which separates axis A from point P.

This fraction is less than 1/6 and in particular about 1/7, the distance AC being for example about 10 cm for a distance AP of about 70 cm.

The very small value of this fraction, which is equal to the ratio between the lever arms AC and AP, results in a proportional increase of the force which must be absorbed axially by the strut 10 to withstand application of force F at point P.

Thus, if said ratio R is equal to 7, the force to be absorbed by the strut 10 is equal to 7F.

For this reason, and because the value F is already very high in itself, it might be thought that such a construction could be scarcely contemplated.

The Applicant has however discovered, surprisingly, that such a construction gave satisfaction because, on the one hand, of the very great rigidity of the framework of the seat-back and, on the other hand, because of the very high axial stresses able to be withstood without damage by the struts and their hinges.

These struts are advantageously formed by tubular sections or by pairs of U shaped sections open in the same direction and fitted one in the other.

They end advantageously, on the beam side, in a cover jointingly covering this beam.

The diagrams of FIGS. 3 and 4 show respectively adjustment of the inclination of the seat-back and tilting or tipping thereof forwards.

In the first case, strut 10 keeps a constant length, the distance between points B and C remaining unchanged: it is the position of point B with respect to base 1 which is modified horizontally along the arrows U.

Such movement allows the inclination of the seat-back to be adjusted about its axis A from a totally raised position b to a highly inclined position c while passing through all the intermediate positions a.

In the second case, point B remains motionless, but the length of strut 10 is modified.

For this, this strut 10 is advantageously formed by two tubular elements mounted telescopically one in the other and a locking mechanism shown schematically at 11 in FIG. 1 makes it possible to interlock these two elements together at will or unlock them.

When they are unlocked, one may penetrate further into the other in the direction of the arrows V, which reduces the distance between the two points B and C and results in tipping of seat-back 4 forwards from its pre-adjusted position a to a tipped position d.

It should be noted that with this solution the pre-adjusted inclination of the seat-back 4 is automatically recovered when, after tipping forward, the seat-back again tips rearwards by a new extension of strut 10.

The locking mechanism 11 may be controlled, in a way known per se, from a control handle 12 provided on the seat-back, via an inextensible cable 13.

Mechanism 11 may be formed in any desirable way.

For example, it may comprise threaded jaws mounted on one of the two telescopic elements and urged resiliently permanently about a central threaded rod connected to the other telescopic element.

It is then sufficient to exert a tractive force on cable 13 for moving these jaws away from the rod and so unlocking the two elements whereas release of the cable locks them together again.

In such a case, adjustment of the inclination of the seat-back may be obtained by simply rotating the threaded rod.

It is not this solution which has been illustrated in FIG. 1, in which is shown a control handle 14 for adjusting the position of axis B in a longitudinal elongate slit 15 of base 1.

In said FIG. 1, it can be seen that two identical and parallel struts 10 are mounted for pivoting, respectively, on the low portions of beam 7 and of L shaped piece 9.

Although it has not been shown, the adjustment mechanisms are then divided over the two struts, with single control members.

In FIGS. 5 and 6, a variant of the inclination adjustment and tipping control mechanism has been shown with greater detail.

In this variant, each strut 10 is formed of a single block and ends at the bottom in a double longitudinal elongate aperture 16 through which a pivot 17 with axis B passes.

This pivot 17 is itself formed with a threaded bore extending in the longitudinal direction of the seat and occupied by a complementary threaded rod 18 which is connected to angular control means 19 such as an electric motor or a manual control knob or handle.

A pivoting bolt 20 mounted about a transverse horizontal axis D of strut 10 is constantly urged by a spring towards its position, shown in FIG. 5, in which it maintains pivot 17 at one end of aperture 16, thus interlocking axis B with the strut 10.

Under these conditions, it is sufficient to rotate rod 18 for progressively moving axis B with respect to base 1 and so adjusting the inclination of seat-back 4.

For controlling tipping of this seat-back, it is sufficient to pull cable 13, which is coupled to bolt 20, so as to remove this bolt from pivot 17.

The movements of strut 10 with respect to pivot 17 are then freed, which allows the lower end of this strut to move to a front endmost position in which the pivot 17 abuts against the rear end of the double aperture 16, as can be seen in FIG. 6: this position corresponds to the state of seat-back 4 when it is completely tipped forward.

Following which and whatever the embodiment adopted, a vehicle seat with built-in safety belt is finally obtained whose construction is sufficiently clear from the foregoing.

This seat has numerous advantages with respect to those known heretofore, in particular concerning both the robustness and the possibility of lending itself not only to inclination adjustment of the seat-back but also to forward tipping thereof.

Furthermore, the proposed construction makes it possible to provide a mechanism 21 (see FIG. 2) for raising the sitting portion which is totally independent of that for adjusting the seat-back since the struts are directly interposed between this seat-back and the base which supports such a mechanism 21 for raising the sitting portion.

As is evident, and as it follows moreover already from what has gone before, the invention is in no way limited to those of its modes of application and embodiments which have been more especially considered; it embraces, on the contrary, all variants thereof.

I claim:

1. A vehicle seat comprising a base, a sitting portion mounted on the base, a seat-back mounted for pivoting movement about a first lower transverse horizontal axis linked to the base of the seat, a means for moving said sitting portion independent of said seat-back, and a safety belt, anchoring points for anchoring this belt to the vehicle seat, one anchoring point being disposed at the top of the seat-back, the framework of the seat-back comprising a vertical laterally located beam which is very flexion resistant and carries the upper anchoring point of the belt, a lower cross-piece fixed to the base of the beam and sufficiently resistant to prevent the transverse inclination of this beam and an L-shaped piece fixed on the beam and on the cross-piece so as to form a frame therewith, at least one buckling resistant strut, the ends of which are mounted for pivoting, respectively, about a second transverse horizontal axis linked to the front of the base and about a third transverse horizontal axis forming part of the beam and disposed at a distance, from the first axis, which is less than 1/6 of the distance separating the first axis from the upper anchoring point, and means acting on the strut for adjusting the position of the third axis about the first axis.

2. A vehicle seat according to claim 1, wherein the beam is of a hollow prismatic box type.

3. A vehicle seat according to claim 1, wherein the cross-piece comprises a metal sheet of essentially trapezoidal shape whose large base is welded to the beam.

4. A vehicle seat according to claim 1, wherein the means for adjusting the position of the third axis are arranged so as to modify the front to rear location of the second axis with respect to the base.

5. A vehicle seat according to claim 4, wherein the means for adjusting includes a threaded rod connected to a control member and mounted on the base of the seat.

6. A vehicle seat according to claim 5, including means controllable from a handle mounted on the seat-back for momentarily disengaging the interconnection between the threaded rod and the strut for moving the seat-back about the first axis.

7. A vehicle seat according to claim 1, wherein the means for adjusting the position of the third axis are arranged so as to modify the distance between the second and third axes.

8. A vehicle seat according to claim 7, wherein the strut has a telescopic construction, the two elements of the telescopic construction being mounted slidingly one in the other, forming this strut and normally mutually interlocked, and including means controllable from a handle mounted on the seat-back for momentarily disengaging such interlocking.

9. A vehicle seat according to claim 1, including a pair of said struts, one on each side of the seat, one being connected to the beam and the other being connected to the L-shaped piece.

* * * * *